(12) United States Patent
Kempf et al.

(10) Patent No.: US 7,054,706 B2
(45) Date of Patent: May 30, 2006

(54) MANAGING SUPPLY CHAINS WITH MODEL PREDICTIVE CONTROL

(75) Inventors: Karl Kempf, Chandler, AZ (US); Kirk Smith, Chandler, AZ (US); Beverly Toperzer, Chandler, AZ (US); Martin W. Braun, Richardson, TX (US); Daniel E. Rivera, Chandler, AZ (US); Wenlin Wang, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/611,253

(22) Filed: Jun. 30, 2003

(65) Prior Publication Data

US 2004/0267394 A1   Dec. 30, 2004

(51) Int. Cl.
   *G06F 19/00*   (2006.01)

(52) U.S. Cl. ............... 700/121; 700/108; 705/10

(58) Field of Classification Search ......... 700/97, 700/99, 106, 100, 29, 45, 108, 121, 120, 700/109, 111, 96, 91, 28; 705/22–28, 8–10, 705/7, 30; 706/50
See application file for complete search history.

(56) References Cited

U.S. PATENT DOCUMENTS

| 5,351,184 | A | | 9/1994 | Lu et al. |
| 5,561,599 | A | | 10/1996 | Lu |
| 5,572,420 | A | | 11/1996 | Lu |
| 5,574,638 | A | | 11/1996 | Lu |
| 5,758,047 | A | | 5/1998 | Lu et al. |
| 5,819,232 | A | * | 10/1998 | Shipman ............... 705/8 |
| 5,946,662 | A | * | 8/1999 | Ettl et al. ............. 705/8 |
| 6,341,271 | B1 | * | 1/2002 | Salvo et al. ........... 705/28 |
| 2002/0174000 | A1 | * | 11/2002 | Katz et al. ............. 705/7 |
| 2003/0126103 | A1 | * | 7/2003 | Chen et al. ........... 706/50 |
| 2003/0158611 | A1 | * | 8/2003 | Weiss .................. 700/31 |
| 2003/0225563 | A1 | * | 12/2003 | Gonos ................. 703/22 |
| 2003/0225635 | A1 | * | 12/2003 | Renz et al. ........... 705/28 |
| 2004/0153359 | A1 | * | 8/2004 | Ho et al. .............. 705/10 |
| 2005/0071266 | A1 | * | 3/2005 | Eder .................... 705/38 |

OTHER PUBLICATIONS

Braun, M.W., D.E. Rivera, W. M. Carlyle, and K. G. Kempf, "Robust management of multi-product, multi-echelon demand networks using Model Predictive Control," Paper 285e, 2001 AIChE Annual Meeting, Reno, NV, Nov. 4-9, 2001, pp. 1-55.

(Continued)

*Primary Examiner*—Kidest Bahta
(74) *Attorney, Agent, or Firm*—Blakely, Sokoloff, Taylor & Zafman LLP (57) ABSTRACT

Entering a demand prediction for a discrete component product manufactured in a supply chain into a model predictive controller, entering inventory information for an inventory in the supply chain that is associated with the discrete component product into the model predictive controller, and controlling the inventory with the model predictive controller based on the demand prediction is disclosed.

20 Claims, 7 Drawing Sheets

OTHER PUBLICATIONS

Braun, M.W., D.E. Rivera, W.M. Carlyle, and K. G. Kempf, "A Model Predictive Control Framework for Robust Management of Multi-Product, Multi-Echelon Demand Networks," 2002 NSF Design, Service and Manufacturing Grantees and Research Conference, San Juan, Puerto Rico, pp. 1-15, Jan. 7-10, 2002.

Braun, M.W., D.E. Rivera, W. M. Carlyle, and K. G. Kempf, "Application of Model Predictive Control to Robust Management Of Multi-Product, Multi-Echelon Demand Networks in Semiconductor Manufacturing," International Conference on Modeling and Analysis of Semiconductor Manufacturing (MASM 2002), Apr. 10-12, 2002, pp. 387-392.

Braun, M.W., D.E. Rivera, W. M. Carlyle, and K. G. Kempf, "A Model Predictive Control Framework for Robust Management of Multi-Product, Multi-Echelon Demand Networks," 15th IFAC World Congress, Barcelona, Spain, Jul. 21-27, 2002. pp. 1-6.

Rivera, D.E., W. Wang, M.W. Braun, and K.G. Kempf, "Control-oriented approaches to inventory management in semiconductor manufacturing supply chains," paper 268c, 2002 AIChE Annual Meeting, Indianapolis, IN, Nov. 3-8, 2002. pp. 1-17.

Wang, W., D.E. Rivera, and K.G. Kempf, "Centralized Model Predictive Control Strategies for Inventory Management in Semiconductor Manufacturing Supply Chains", Session: Control of Industrial Process. To be presented at the 2003 American Control Conference, Denver, CO, Jun. 4-6, 2003. pp. 1-16.

Wang, W., D.E. Rivera, and K.G. Kempf, "Centralized Model Predicitive Control Strategies for Inventory Management in Semiconductor Manufacturing Supply Chains", to be presented at the 2003 American Control Conference, Denver, CO, Jun. 4-6, 2003. pp. 1-6.

AICHE 2000 Annual Meeting, Los Angeles, Paper 262f. [online] Retrieved from the internet on May 22, 2003. Retrieved from the Internet at http://www.eas.asu.edu/NCSEL/SCM2000.pdf. pp. 1-10.

Braun, M., "A Model on Demand Nonlinear Estimation and Model Predictive Control: Novel Methodolgies For Process Control And Supply Chain Management"; Thesis, Chapter #5, Applications of MoDMPC Concepts to Supply Chain Management, pp. 197-338. Dec. 2001.

Daniels, V., Rivera, D. and Carlyle, M.; Arizona State Universtiy, Designing and Managing Dynamic Supply Chains with Model-on-Demand Predictive Control. NSF Scalable Enterprise Systems Initiative Workshop, Jan. 7, 2001, Tampa Florida. pp. 1-10.

W. Wang, J.Ryu, D.E. Rivera, K.G.Kempf and K.D. Smith, "A Model Predictive Control Approach for Managing Semiconductor Manufacturing Supply Chains Under Uncertainty," e-Proc. AIChE Annual Meeting (San Francisco), Paper 446d, 2003, 34 pages.

M.W.Braun, D.E. Rivera, M.E. Flores, W.M. Carlyle and K.G. Kempf, " A Model Predictive Control Framework For Robust Management of Multi-Product Multi-Echelon Demand Networks", Annual Reviews in Control, Special Issue on Enterprise Integration and Networking, vol. 27, Issue 2, p. 229-245, 2003. (derived from #83).

M.W.Braun, D.E. Rivera, W.M Carlyle and K.G. Kempf, "Application of Model Predictive Control to Robust Management of Multi-Echelon Demand Networks in Semiconductor Manufacturing," Simulation: Transactiond of the Society for Modeling and Simulation International, vol. 79, No. 3, p. 139-156, Mar. 2003. (derived from # 90).

* cited by examiner

MANAGING SUPPLY CHAINS WITH MODEL PREDICTIVE CONTROL

BACKGROUND

1. Field

An embodiment of the invention relates to the field of supply chain management. In particular, the embodiment relates to the field of managing an inventory in a discrete component manufacturing supply chain based on model predictive control.

2. Background Information

Supply chains are found in many manufacturing and service industries. A manufacturing supply chain, also known as a demand network or value web, generally represents a network of interconnected manufacturing and distribution facilities that procure materials, transform the materials into intermediate and finished products, and distribute the finished products to customers. The structure of the supply chain may be organized and managed with a goal of maintaining a high level of customer service, minimizing costs, and maximizing profits. The supply chain that flourishes, and gains market share, generally favors customer service, for example by providing its customers the right product, in the right amount, at the right time, for the right price, and at the right place, while suppressing major costs, such as materials, production, storage, and transport.

Large cost reductions and increased profitability may generally be achieved through improved management of supply chains. Taking the semiconductor supply chain as an example, some experts predict that billions of dollars in cost reductions may be achieved through improved management of semiconductor supply chains. Some experts hold the belief that individual companies no longer compete against other individual companies, but rather supply chains compete against other supply chains. Accordingly, the quality management of a supply chain may represent an important and valuable factor in determining the success of a manufacturing enterprise.

Traditionally, supply chains and inventories thereof have often been managed through cost-optimal stochastic programming solutions from the field of operations research. These approaches are generally time consuming, and often involve evaluating and examining numerous "what-if" scenarios by highly skilled professionals. Additionally, these approaches are generally poorly suited for handling dynamically changing variables, such as consumer demand and materials supply dynamics. In supply chains, variables such as consumer demand for product may continually and dynamically change. Such changes in demand may outdate cost-optimal stochastic programming solutions and merit their re-evaluation, which may be time consuming and cost prohibitive.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

I. Introduction

The inventors have recognized that an existing control methodology from a non-analogous art, namely model predictive control, may provide an attractive alternative to the conventional cost-optimal stochastic programming solutions, from the field of operations research. In one aspect, the inventors have recognized that supply chains are dynamical systems that may benefit from management based on a control-oriented approach. In the supply chains, variables such as consumer demand for product may dynamically and continually change. Such changes in the demand may outdate cost-optimal stochastic programming strategies and necessitate their re-evaluation. Re-evaluating the stochastic approaches is often time consuming and is done infrequently. This may represent a loss of efficiency in managing the supply chain and a significant cost incurred due to changing demand.

Model predictive control, which is discussed further below, is a known technique that generally allows solving an objective function, subject to any appropriate constraints, by an approach such as a quadratic programming algorithm. Historically, model predictive control has been employed in the non-analogous art of continuous control of processing plants in the chemical industries. Typically, model predictive control has been used to control levels in tanks, temperatures, pressures, flow rates, and the like occurring in single processing plant at a single site. The approach is based on differential equations relating tank levels to flows into and out of the tank generally assuming conservation of mass.

In one aspect, the inventors have adapted model predictive control to control and manage inventories of discrete components and other aspects of manufacturing supply chains. The mass balance traditionally used in model predictive control may be adapted to model the manufacturing parameters that effect inventory level. The model predictive control may be used to control parameters such as inventory levels in multiple, potentially geographically dispersed or separated nodes, or manufacturing facilities, in a supply chain.

Model predictive control may be employed as both an optimizer and a controller. As an optimizer, model predictive control may minimize or maximize an objective function that represents a suitable measure of supply chain performance. As a controller, model predictive control may be tuned to achieve stability, robustness, and performance in the presence of plant/model mismatch, failures, and disturbances that affect the system. Practitioners may employ one of numerous commercially available model predictive control software applications, for example those available from Aspen Technologies of Cambridge, Mass.

The control afforded by model predictive control appears to be well suited for handling the dynamically changing variables, such as consumer demand for product, which often occur in uncertain, noisy environments, such as supply chains. Additionally, the model predictive control approach generally offers flexibility in terms of information sharing, network topology, and constraints that may be handled.

II. Controlling Inventory with Model Predictive Control Based on Predicted Demand Supply chain management and coordination generally has more value when reasonably accurate demand forecasts or other predictions are available. Demand predictions are generally used in making product order forecasts and targeting inventory levels. Reasonably accurate demand predictions may benefit nodes downstream from the customers in the supply chain and allow appropriate inventory levels to be maintained.

A common problem in many supply chains is demand distortion, also known as the "bullwhip effect". Demand distortion is generally characterized as an amplification of the variance in customer demand as observed in inventory levels and order quantities further up the nodes of the network. Symptoms of demand distortion often include excessive inventories, poor customer service due to unavailable products, uncertain production planning, and the like. A primary purpose of inventories is to buffer against uncertainties that might exist in the supply chain. Many supply chains deliberately maintain larger than necessary inventories to counteract the effect of demand distortion. Taking the semiconductor manufacturing industry as an example, it is not uncommon to maintain inventories for several months of operation.

In many supply chains the inventory often represents a substantial amount of the overall capital that is tied up in the supply chains. Holding such excessive inventories may incur costs that are a significant fraction of their total value. Reducing unnecessary inventory to appropriate levels generally translates into increased value and profitability for the supply chain.

Figure 1:
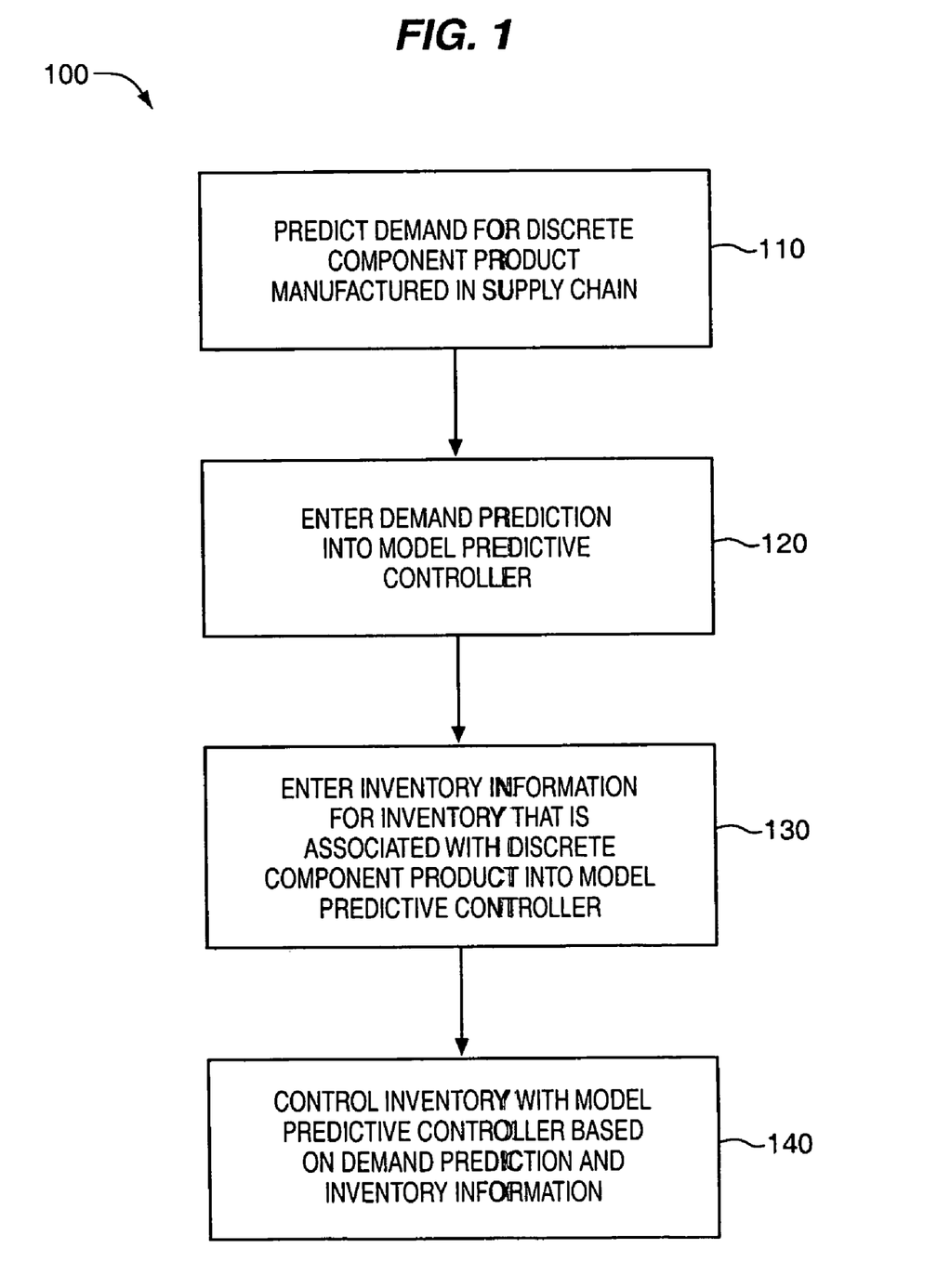
FIG. 1 shows a method for controlling an inventory of a discrete component in a discrete component manufacturing supply chain with a model predictive controller based on a predicted demand for the discrete component and inventory information, according to one embodiment of the invention.

FIG. 1 shows a method 100 for controlling an inventory of a discrete component in a discrete component manufacturing supply chain with a model predictive controller based on a predicted demand for the discrete component and inventory information, according to one embodiment of the invention. The method includes predicting a demand for a discrete component product manufactured in a supply chain, at block 110, entering the demand prediction into a model predictive controller, at block 120, entering inventory information for an inventory that is associated with discrete component product into the model predictive controller, at block 130, and controlling the inventory with the model predictive controller based on the demand prediction and the inventory information, at block 140.

In predicting the demand for the discrete component, at block 110, a number of conventional demand prediction or forecasting methodologies known in the supply chain management arts may be used to predict a demand or a change in demand for the discrete component. Suitable demand prediction methods include, but are not limited to, methods based on moving averages, exponential smoothing, causal forecasting, Box-Jenkins, and Bayesian methods. For example, a demand predictor may be based on an ARIMA (autoregressive integrated moving-average) method. Some of these methods may receive demand prediction information as input. Exemplary demand prediction information includes, but is not limited to, information about current demand, sample demand information from customers, information on marketing or advertisement efforts or expenditures, historical trend information, and a wide variety of other demand prediction information (e.g., whether it is close to Christmas). Other demand predictors include experts in the field who may predict demand based on heuristics, rules of thumb, empirical observations, etc. Still other demand predictions include trade journals, newsletters, and surveys, where information about demand is available.

The demand prediction may be for a future time that is appropriate for managing the supply chain. In one embodiment of the invention, the future time may be the same as, proportional to, or at least related to, a throughput time associated with the supply chain. The throughput time may represent an overall throughput time for the supply chain, a longest throughput time, a shortest throughput time, a throughput time of any node or other portion of the supply chain, or another throughput time that is appropriate for the particular implementation. In general, if the future time is too far in advance then accuracy of the prediction may suffer, and if the future time is too near to present then inventories may have insufficient time to respond.

Then, the demand prediction may be input or otherwise entered into a model predictive controller, at block 120, and inventory information for an inventory that is associated with the discrete component product may be input or entered into the model predictive controller, at block 130. The demand prediction and inventory information may be entered by software or manually by one or more users. As one example, a practitioner at a supply chain control center may phone various nodes of a supply chain to obtain inventory information, may run a demand prediction algorithm, and may then use a data entry device of a computer system to enter the inventory information and demand prediction into a model predictive controller. Alternatively, various information transfer may be automated by way of information exchange over a network of a supply chain to autonomously enter inventory information, or a demand prediction. For example, an inventory system, such as an enterprise resource planning system or inventory accounting system, may enter inventory information into a model predictive controller, and the model predictive controller may run, or call, a demand prediction module, to obtain a demand prediction.

Then, the model predictive controller may control an inventory of the discrete component in the discrete component manufacturing supply chain based on the predicted demand and the inventory information, at block 140. The predicted demand may be provided to the model predictive controller as an input, such as a measured disturbance. The model predictive controller may solve objective function equations incorporating the demand prediction, subject to any optional imposed constraints, such as safety stocks for inventories, and may generate a solution consistent with the predicted demand. Generally the model predictive controller may provide or make available supply chain control information based on the solution and the predicted demand.

Exemplary supply chain control information may include, but is not limited to, inventory modification information. The inventory modification information may indicate to add a quantity to an inventory, remove a quantity from an inventory, partition an inventory into a plurality of smaller inventories, or otherwise modify an inventory. For example, the inventory modification information may include an instruction or transfer order to transport an integer X number of units of component to a downstream inventory. The inventory modification information may also indicate to modify a plurality of inventories of products having related demands. The supply chain, or a representative thereof, such as a human representative, or an automatic ordering system, may receive the control information and implement the control over the supply chain.

Potential advantages of including the demand prediction in controlling the supply chain include avoiding, or at least suppressing, demand distortion, and minimizing, or at least reducing, supply chain inventories. It may be appropriate to update the model predictive controller with updated demand predictions periodically, or frequently. For example, the demand may be predicted at least once a day, at least once every two days, at least once a week, at least twice a week, or at least several times a month. At least to a point, the more frequent the updating of the demand prediction, generally the more efficient the control of the inventories of the supply chain.

Discrete component manufacturing supply chains that may be controlled based on the method discussed above abound in the electronic and other arts. One suitable discrete component manufacturing supply chain includes the semiconductor manufacturing supply chain that manufactures microprocessors and other discrete microelectronic devices. Another suitable discrete component manufacturing supply chain includes the computer system manufacturing supply chain that assembles microelectronic devices and other components to manufacture computer systems, such as desktop computer systems, laptop computer systems, servers, etc. Still another suitable discrete component manufacturing supply chain includes a communication device manufacturing supply chain that manufactures and/or assembles cellular telephones, other wireless communication devices, or portions thereof. Yet another suitable discrete component manufacturing supply chain includes an expansion card supply chain that manufactures and/or assembles parts for expansion cards, such as graphics cards, for computer systems. Other examples of discrete component manufacturing supply chains that may control inventories based on the method discussed above will be apparent to those skilled in the art having the benefit of the present disclosure.

Figure 2:
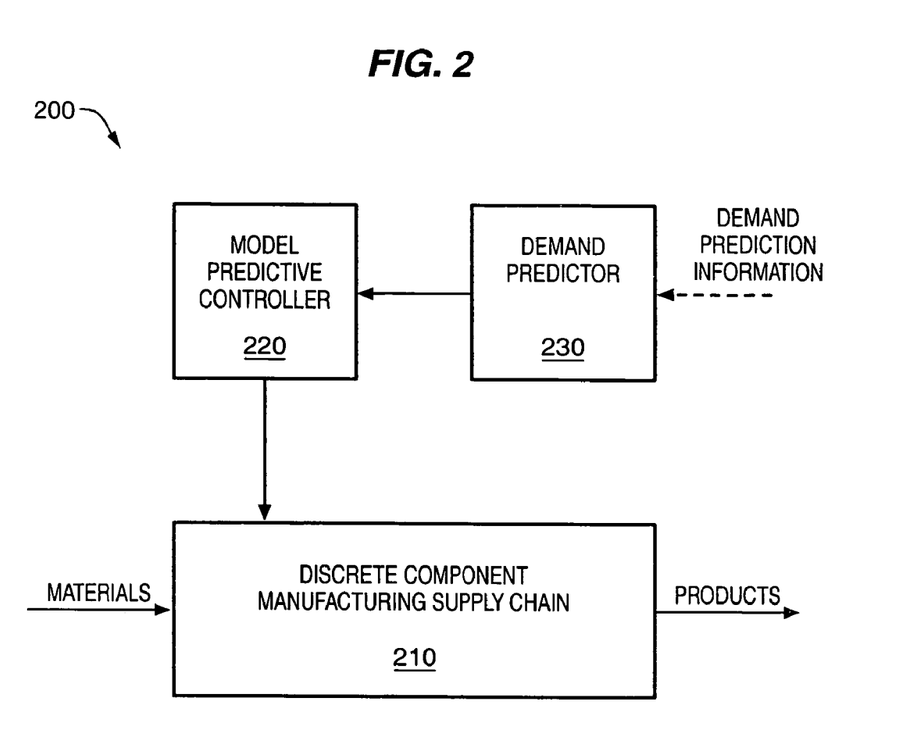
FIG. 2 shows a discrete component manufacturing supply chain controlled by a model predictive controller based on a demand prediction provided by a demand predictor, according to one embodiment of the invention.

FIG. 2 shows a discrete component manufacturing supply chain 210 controlled by a model predictive controller 220 based on a predicted demand generated or otherwise provided by a demand predictor 230, according to one embodiment of the invention. The discrete component manufacturing supply chain generally receives materials and produces products including discrete components that are manufactured in the supply chain. The demand predictor is logically connected with the model predictive controller to provide a prediction of demand to the model predictive controller. In the illustrated embodiment, the demand predictor receives demand prediction information that may be used to predict the demand. The model predictive controller is logically connected with the manufacturing supply chain to control some aspect of the supply chain, such as one or more inventories thereof, based on the demand prediction.

In one aspect, the model predictive controller and the demand predictor may include software in the form of instructions stored on a machine-readable medium. For example, the model predictive controller may include a software application resident on a computer system at a facility or node of the supply chain, or a distributed application having portions resident on a plurality of computer systems at a plurality of geographically dispersed facilities of the supply chain. Alternatively, the model predictive controller may include hardware, or a combination of software and hardware.

III. Illustration with Semiconductor Manufacturing Supply Chain

Figure 3:
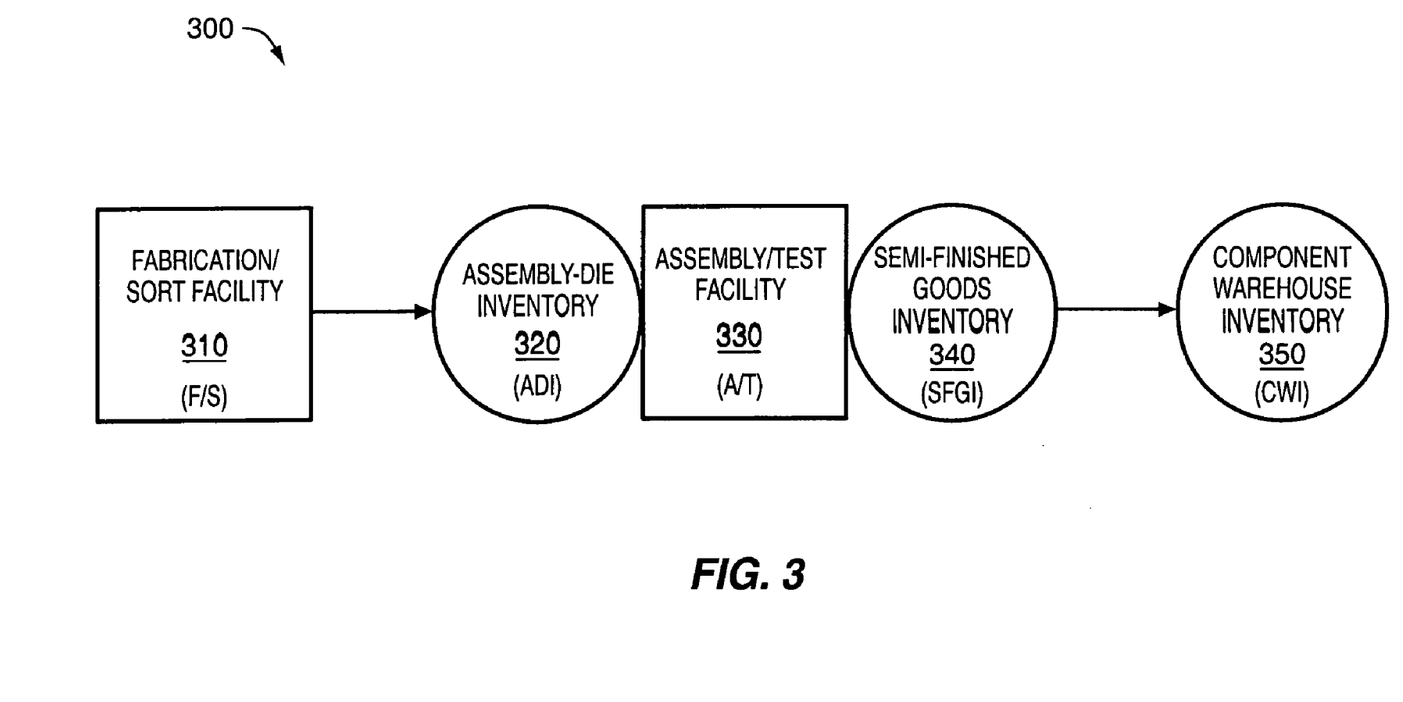
FIG. 3 shows an illustrative semiconductor manufacturing supply chain, according to one embodiment of the invention.

FIG. 3 shows an illustrative semiconductor manufacturing supply chain 300, according to one embodiment of the invention. The supply chain includes a single product, three-node supply chain with a plurality of staged or serial inventories. The staged inventories may help buffer variations in component flow through the supply chain. A first node of the supply chain includes a Fab/Sort (F/S) facility 310. A second node includes an Assembly-Die Inventory (ADI) 320, an Assembly/Test (A/T) facility 330, and a Semi-Finished Goods Inventory (SFGI) 340. A third node includes a Component Warehouse Inventory (CWI) 350. The ADI, SFGI, and CWI represent exemplary inventories that may be controlled based on model predictive control and based on a demand prediction.

In a representative semiconductor process, clean wafers and other materials may be procured and provided to the F/S facility. The wafers may be processed to form die on wafers within the F/S facility. The processing often takes a period of time in a range between about 4 to 10 weeks, although this is not required. Then, the wafers with die may be transported from the F/S facility to the A/T facility for assembly into packages and testing. Initially, the wafers with die may be received into the ADI and stored until a time of assembly and testing. Then, the die may be assembled into packages and tested within the A/T facility. Then, after the assembly and the testing, the tested packages may be placed in the SFGI and stored. The die and packages are often retained in the second node for a time in a range between about 1 to 3 weeks, although this is not required. The packages may be transported from the SFGI to the CWI. The CWI may serve as a distribution center, and the packages may be stored in the CWI until removed, for example, according to customer demand.

Figure 4:
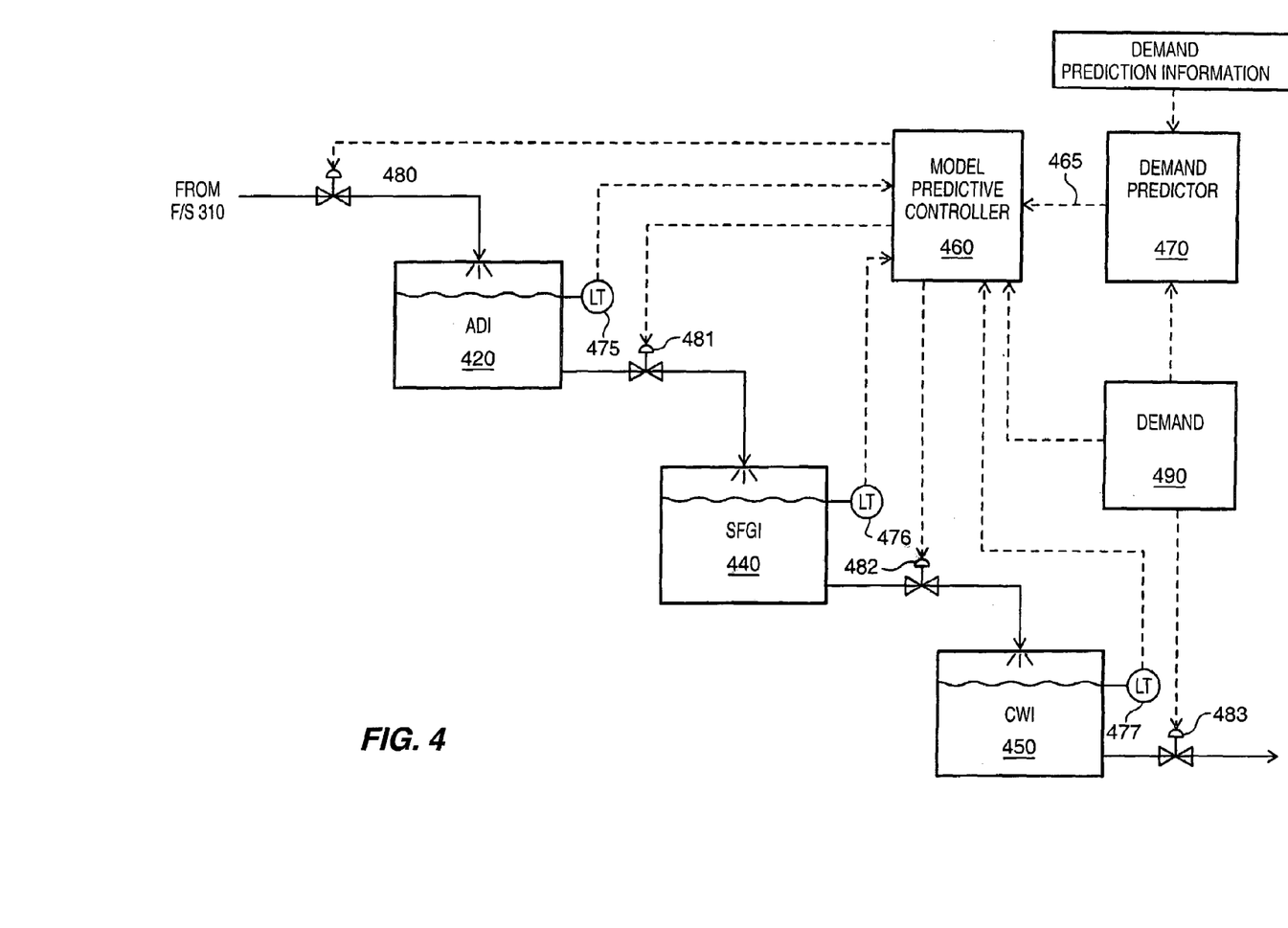
FIG. 4 shows a centralized control structure for controlling inventories of the supply chain of FIG. 3 with a model predictive controller equipped with a prediction of demand from a demand predictor, according to one embodiment of the invention.

FIG. 4 shows a centralized control structure for controlling the inventories of an ADI 420, SFGI 440, and CWI 450 with a model predictive controller 460 equipped with a prediction of demand 465 from a demand predictor 470, according to one embodiment of the invention. The centralized control structure may be appropriate if inventory level and demand information may readily be shared among the nodes, for example if all of the nodes in the controlled supply chain are commonly owned, although the use of a centralized control structure is not required. In an alternate embodiment of the invention, a decentralized control structure may optionally be employed.

The centralized control structure used to control the levels of inventories in the supply chain has been analogized to the centralized control structure often used in the chemical process industries to control fluid levels in cascading tanks to better illustrate the concepts. In the analogy, the staged inventories of the supply chain correspond to liquid levels in cascading tanks. A plurality of inventory monitors 475–477, shown here as liquid level taps (LT), are used to monitor and report inventory levels to the model predictive controller. In a supply chain the inventory monitors may include personnel who watch over the inventory, or enterprise resource management applications, or other inventory accounting systems. Likewise, a plurality of inventory controllers 480–483, shown here as control valves, are used to control either the addition or removal of components, such as die or packages, to or from an inventory or tank. In a supply chain the inventory controllers may include, for example, personnel, or applications, that access inventory control information, for example from a user interface, and implement the control on an inventory. Safety stock levels may be used as setpoints, constraints (e.g., lower limits), or optimization targets, for inventories. Piping transportation lags may be used to denote throughput times in the F/S and A/T facilities. Yields, such as the yield encountered going from ADI 420 to SFGI 440, may be modeled using a gain in model predictive control. The analogy, while included because it is believed to be helpful in demonstrating the concepts of the application of model predictive control to supply chains, should not be inappropriately extended.

In addition to receiving the monitored inventory levels, the model predictive controller may receive the predicted demand 465 from the demand predictor 470. In the illustrated embodiment of the invention, a real demand 490, corresponding to removal of product from the CWI, is optionally provided to the demand predictor and may be used in generating the predicted demand 465, although this is not required. The demand predictor may also optionally receive other demand prediction information. Based on such demand prediction information, the demand predictor may generate the demand prediction 465 and provide the demand prediction to the model predictive controller. The real demand 490 may optionally be provided to the model predictive controller 460.

The model predictive controller may receive the monitored inventory levels and the demand prediction. The demand prediction along with the model of the flow of products provided by model predictive control allows the model predictive controller to anticipate, proactively control, and modify inventory levels. The model predictive controller determines and provides control settings or actions to the plurality of inventory controllers. In the illustrated analogy, the model predictive controller provides control settings to inventory monitors 475–476, but not inventory monitor 477, although this is not required. In an alternate embodiment of the invention, the model predictive controller may control the removal of components from the CWI. The model predictive controller may strive to satisfy the demand of products from the CWI, while maintaining inventory levels in the inventories at or near the setpoint, constraint, or optimization target values.

In the case of an anticipated increase in demand, when the model predictive controller anticipates the setpoint, constraint, or optimization target change, it may make the manipulated variables change before the setpoint, constraint, or optimization target change takes place in order to meet the demand due to accounting for the throughput change in the system. In a supply chain context, this may include providing an indication of an inventory modification, such as a number of products to be added to an inventory, or removed from an inventory. The indication may be provided through text on a display screen or printout or by other mediums used to communicate software results or calculations. Then, when the increase occurs, inventories may be drained below their setpoint, constraint, or optimization target values in order to satisfy or fill the needs of the upstream node or customer demand. Then the inventories may increase, stabilize, and properly return to their setpoint, constraint, or optimization target values.

Simulations by the inventors indicate that good control over inventory levels is generally achieved in spite of variability in demand. The inventories of the supply chain often adjust before significant change in the real demand due at least in part to the anticipation made possible by the demand prediction. The customer demand is generally met and backorders are not required. If appropriate, move suppression terms, model predictive controller tuning parameters, or other sophistications may optionally be employed in the model predictive control model in order to improve robustness, stability, or other performance metrics, when model mismatch, variance, or other complications are encountered. Model predictive control generally provides flexibility in tuning parameters to improve control when faced with mismatch, unpredicted variability in demand, etc.

IV. Partitioning Inventories Based on Model Predictive Control

In many supply chains the same type of component may be utilized in multiple products sold to consumers. The products sold to the consumers may be subject to different demands in the marketplace.

In the case of microprocessors, a common decision made at an Assembly/Test (A/T) facility is how many microelectronic devices or die to assemble into each of a plurality of different types of microelectronic packages. A wide variety of different types of microelectronic packages are available for microprocessors. Exemplary microelectronic packages include, but are not limited to, those based on ceramic substrates for mounting the die, such as Ceramic Pin Grid Array (CPGA) or Ceramic Dual In-Line Package (CDIP), and those based on organic substrates for mounting the die, such as Organic Land Grid Array (OLGA) or Flip Chip Pin Grid Array (FCPGA). Different packages are generally used for different applications. For example, a ceramic package may be more appropriate for a microprocessor employed in a high cost server, where high temperatures may be encountered during use, and thermo-mechanical stresses may be greatest. Yet the ceramic package may not be as appropriate in a laptop where lower temperatures are often expected, and where weight, size, and cost may assume a greater importance.

Wisely making the decision of how many microelectronic devices or die to assemble into each of the plurality of different types of microelectronic packages generally benefits from market information, such as demand for one or more of the different products. A method, according to one embodiment of the invention, may include splitting or otherwise partitioning an intermediate inventory of components, such as dice or other microelectronic devices, into a plurality of smaller inventories that each correspond to different discrete component products with the model predictive controller, or an inventory partitioning sub-controller thereof, based on the demand prediction. The demand prediction may correspond to at least one product associated with an inventory into which the intermediate inventory is split.

Figure 5:
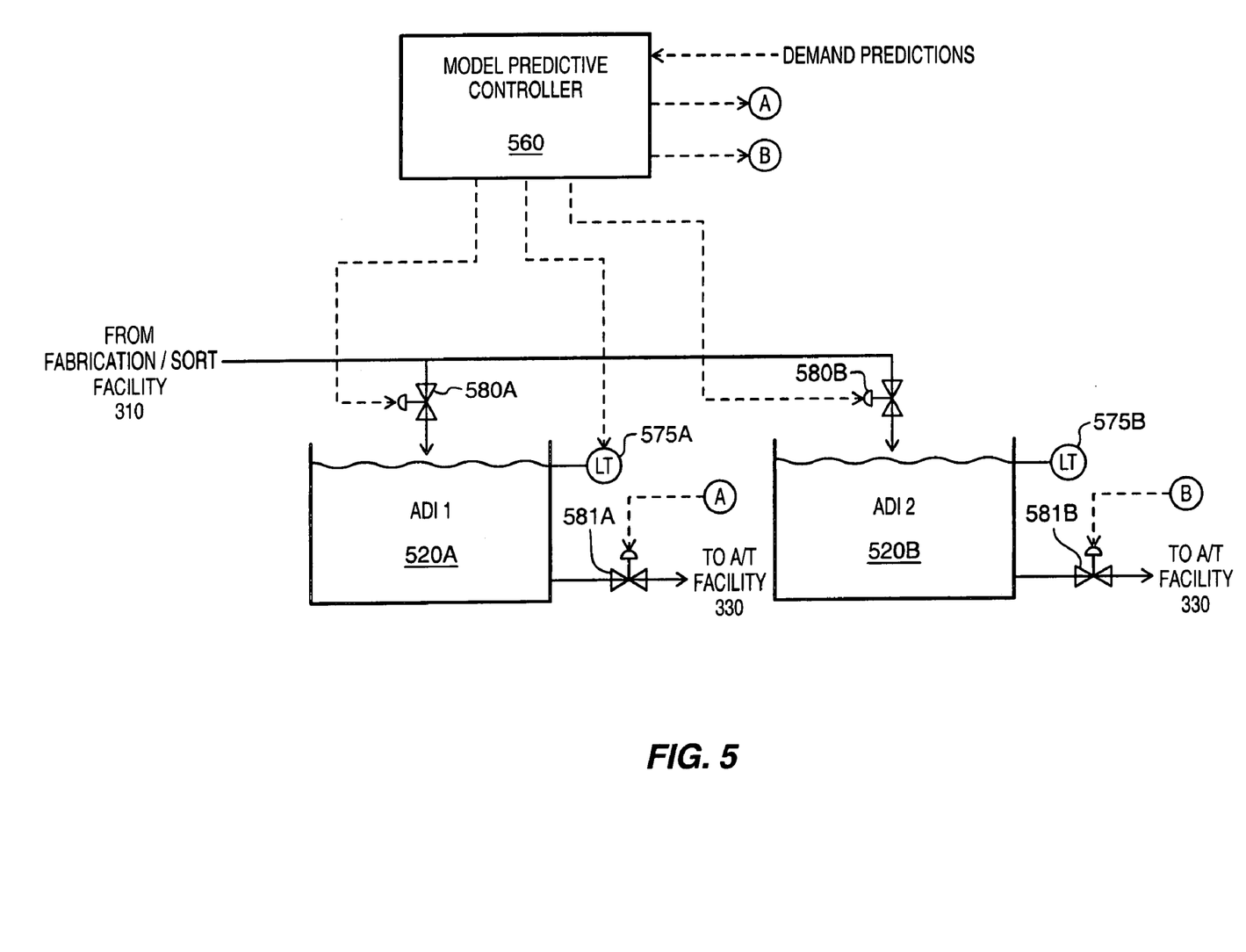
FIG. 5 shows a centralized control structure for partitioning dice into a plurality of inventories corresponding to different microelectronic packages with a model predictive controller based on a demand prediction for a product associated with at least one of the packages, according to one embodiment of the invention.

FIG. 5 shows a centralized control structure for partitioning dice into a first assembly-die inventory (ADI1) 520A and a second assembly-die inventory (ADI2) 520B with a model predictive controller 560 based on a demand prediction, according to one embodiment of the invention. Initially, dice may be received from a Fabrication/Sort (F/S) facility, such as the F/S facility 310. The model predictive controller may receive the demand prediction. The demand prediction may be a demand for a single product, for example a single product associated with the ADI1, or demands for a plurality of products, such as a first product associated with the ADI1 and a second product associated with the ADI2. Based on the demand prediction, or predictions, an inventory partitioner sub-controller of the model predictive controller may partition the received dice into the ADI1 and the ADI2. The model predictive controller may provide inventory modification information indicating to modify the ADI1, the ADI2, or both. For example, in a simple scenario, if the demand prediction indicates that demand for products of the ADI1-type is to remain constant, and the prediction indicates that demand for the products of the ADI2-type is to increase, then the model predictive controller may partition such that the ADI1 inventory is unchanged and the ADI2 inventory is increased.

In the analogy, the inventory modification information is represented as control information or signals to inventory controllers, shown here as flow control valves. Control information may be provided to an ADI1 addition controller 580A to control addition of dice into the ADI1, and to an ADI1 removal controller 581A to control removal of dice from the ADI1. Likewise, control information may be provided to an ADI2 addition controller 580B to control addition of dice into the ADI2, and to an ADI2 removal controller 581B to control removal of dice from the ADI2. The control may be based on current inventories as well as the demand prediction. A first inventory monitor 575A may be used to monitor and report an inventory of the ADI1 to the model predictive controller, and a second inventory monitor 575B may be used to monitor and report an inventory of the ADI2 to the model predictive controller.

The dice removed from the ADI1 and ADI2 may be removed to an Assembly/Test (A/T) facility, such as A/T facility 330. In the A/T facility the dice of the ADI1 and the ADI2 may be separately processed and packaged into different types of packages. For example, an ADI1 die may be packaged with a ceramic die support substrate and an ADI2 die may be packaged with an organic die support substrate. Other types of packages, of which there are a wide number available, may also optionally be employed.

In an alternate embodiment of the invention, inventories of components other than dice may be partitioned. For example, inventories of other microelectronic devices (e.g., chipset components), computer system equipment, telecommunications equipment, cellular telephone equipment, automotive parts, and the like may be partitioned into separate inventories based on control from a model predictive controller equipped with a demand prediction. It is not required that the partitioning be for packaging purposes, but may be for other purposes, such as transportation, labeling, etc.

V. Controlling Inventories of Products with Related Demands Based on Model Predictive Control In many supply chains a plurality of different finished products sold in the marketplace may have demands that are identical, correlated, or at least approximately related to one another. A method according to one embodiment of the invention may include controlling a plurality of inventories of different discrete components that are associated with products that each have related demands with the discrete component product with the model predictive controller, based on the predicted demand for the discrete component product. The components may include finished products or intermediate products associated therewith, and the inventories may be controlled even if the components are manufactured in different facilities. The concepts are further illustrated with an example from the computer industry.

Figure 6:
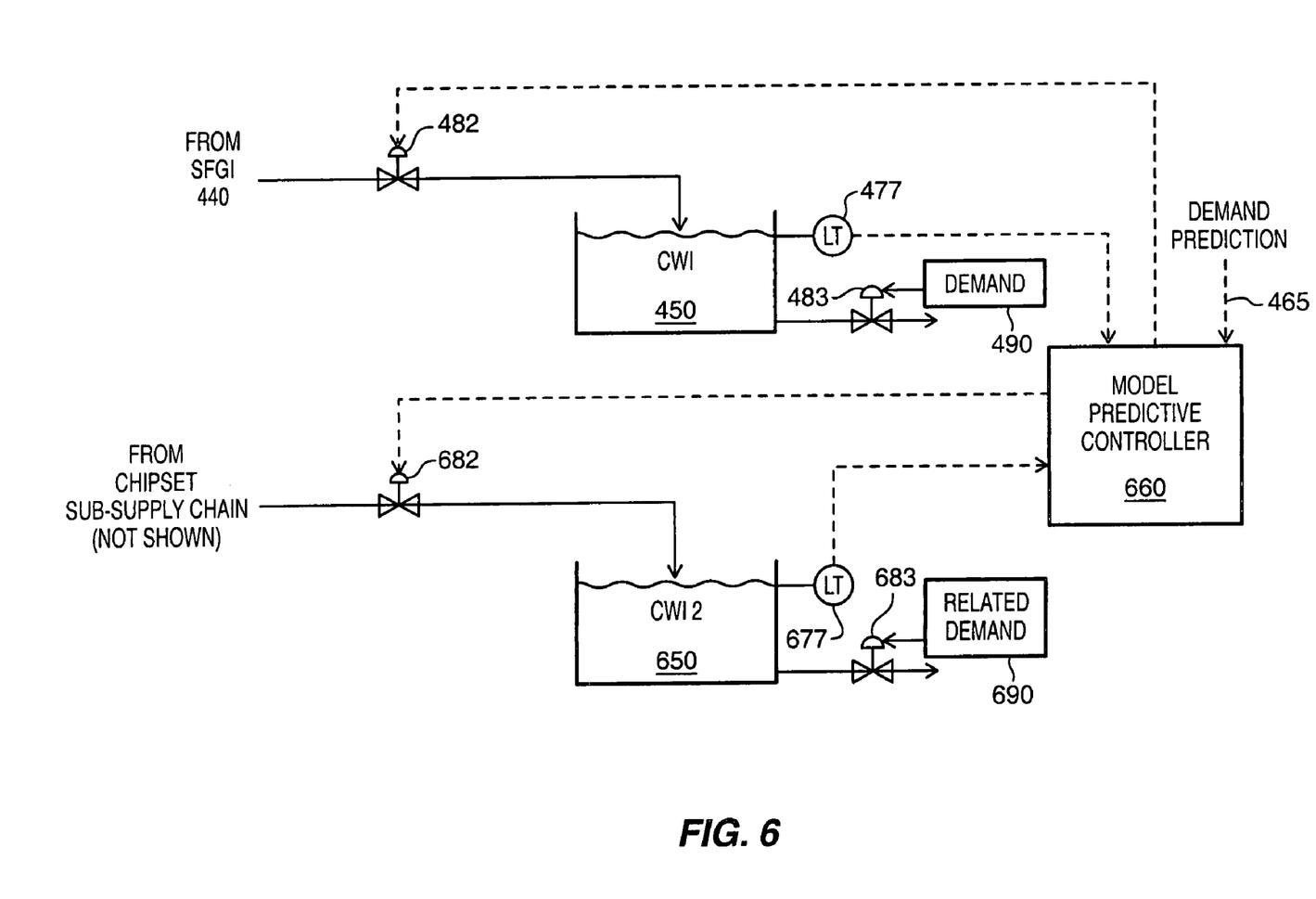
FIG. 6 shows a centralized control structure for controlling an inventory of microprocessors and an inventory of microelectronic devices, which belong to a chipset having a correlated demand with the microprocessors, with a model predictive controller, according to one embodiment of the invention.

In the computer industry, microprocessors and certain microelectronic devices of a chipset, such as a memory controller chip (MCH) and an I/O controller chip (ICH), are often demanded and sold together. FIG. 6 shows a centralized control structure for controlling a first component warehouse inventory of microprocessors (CWI 450) and a second component warehouse inventory of chipset microelectronic devices (CWI2 650), with a model predictive controller 660, based on a demand prediction 465, according to one embodiment of the invention. The demand prediction is generally for the microprocessors, although this is not required.

The microprocessors may be received into the CWI from the SFGI 440 under the control of the model predictive controller 660 as discussed above in FIG. 4. The removal of microprocessors from the CWI may be approximately equal to a real demand 490.

The chipset devices may be received from a chipset sub-supply chain or portion (not shown). A first inventory controller 682 may control the addition of the chipset devices into the CWI2 650 based on control information from the model predictive controller. A second inventory controller 683 may control removal of the chipset devices from the CWI2 based on control information from the model predictive controller. The demand for the chipset devices may be about identical, or at least related, to the demand for the microprocessors. A level monitor 677 may monitor the CWI2 and report the inventory to the model predictive controller.

The model predictive controller may control the first component warehouse inventory of microprocessors (CWI 450) and the second component warehouse inventory of microelectronic devices (CWI2 650) based on level information reported by the inventory monitors and based on the predicted demand for microprocessors. The model predictive controller may modify the CWI and CWI2 inventories consistent with the relationship between their demands. For example, if the demand prediction indicates an increase (or decrease) in microprocessor demand, then the model predictive controller may control an increase (or decrease) in the CWI and the CWI2. Alternatively, the relationship between the demands of products may be inversely related, and the model predictive controller may decrease an inventory of a first component, based on an increase in a demand prediction for a second component.

In an alternate embodiment of the invention, inventories of other discrete components besides processors and chipset devices having related demands may be controlled with a model predictive controller based on a predicted demand for at least one of the discrete components. For example, inventories of other computer system equipment (e.g., computer chassis, display devices, mice, or keyboards), automotive parts (e.g., car bodies, steering wheels, and tires), and the like, may be controlled.

VI. Model Predictive Control

A brief summary of model predictive control is included in this section and further background is available in numerous sources. Model predictive control is an optimization-based control scheme that may be tuned for good performance and robustness properties. The formulation of model predictive control may integrate optimal control, stochastic control, control of operations with dead time, and multivariable control. Model predictive control may also handle constraints on manipulated variables, controlled variables, optimization targets, etc.

In a representative example of applying model predictive control to control inventories, such as the ADI, SFGI, and CWI inventories discussed above, with a centralized controller, the goal of the model predictive control may be represented as the following exemplary objective function:

$$\min_{u(k|k),\ldots,\Delta u(m-1+k|k)} J \quad (1)$$

$$J = \sum_{i=0}^{p-1} \|w_{i+1}^y [y(k+i+1|k) - r(k+i+1)]\|^2 +$$

$$\|w_i^{\Delta u} \Delta u(k+i|k)\|^2 + \|w_i^u [u(k+i|k) - u_{target}(k)]\|^2$$

The objective function may be solved subject to the following exemplary model predictive control constraints:

$$u_i^{min} \leq u(k+i|k) \leq u_i^{max} \quad (2)$$

$$\Delta u_i^{min} \leq \Delta u(k+i|k) \leq \Delta u_i^{max}$$

$$i = 0, \ldots, p-1$$

$$y_i^{min} \leq y(k+i+1|k) \leq y_i^{max}$$

$$\Delta u(k+j|k) = 0$$

$$j = m, \ldots, p$$

$$r, d = [x_k]$$

$$k = 1, \ldots, t_{final}$$

In the above objective function and constraints, x(k) are the state of the system, u(k) are manipulated variables or command inputs, v(k) are measured disturbances, d(k) are unmeasured disturbances, and y(k) is the output vector, which is comprised of measured outputs $y_m(k)$ and unmeasured outputs $y_u(k)$ Here the term p is the prediction horizon and m is the control horizon. The terms $w_i^u$, $w_i^{\Delta u}$, $w_i^y$ are penalties on the control signal, move size, and control error, respectively. The term r is the references of the outputs. The term $x_k$ is the anticipation reference value at time k. The use of future references in model predictive control is referred to as anticipative action when the value of reference is known in advance. A similar anticipative action may be performed with respect to measured disturbances v(k). The term $t_{final}$ is the end time for the whole simulation.

In the J summation, the first squared term represents a difference between inventory level measurements and inventory target levels. The second squared term represents a change of starts. The third squared term represents a difference between starts and starts targets. In the constraints, the first two constraints represent exemplary start constraints. The third constraint represents an exemplary inventory constraint. The r,d=[$x_k$] represents and anticipation constraint. Such objective functions subject to constraints may be solved by quadratic programming algorithms, or by other solutions for simultaneous equations known in the arts.

Rather than developing their own model predictive control software, many practitioners may utilize commercially available model predictive control software. Exemplary software applications are available from Aspen Technology, Honeywell Hi-Spec, Adersa, PCL, MDC, Continental Controls, or Pavilion Technologies. Often these packages present a user interface through which a user may specify a control problem and parameters. The vendors of these software packages may provide additional guidance on setting up a particular control problem.

Further background information on model predictive control is available in numerous sources. One source is the book Model-Based Predictive Control: A Practical Approach, by J. A. Rossiter, available from CRC Press, Control Series, June 2003. Another source of background information is the book Model Predictive Control (Advanced Textbooks in Control and Signal Processing) by E. F. Camacho et al., (Editor), Springer Verlag, June 1999.

VII. Exemplary Computer Architecture

Figure 7:
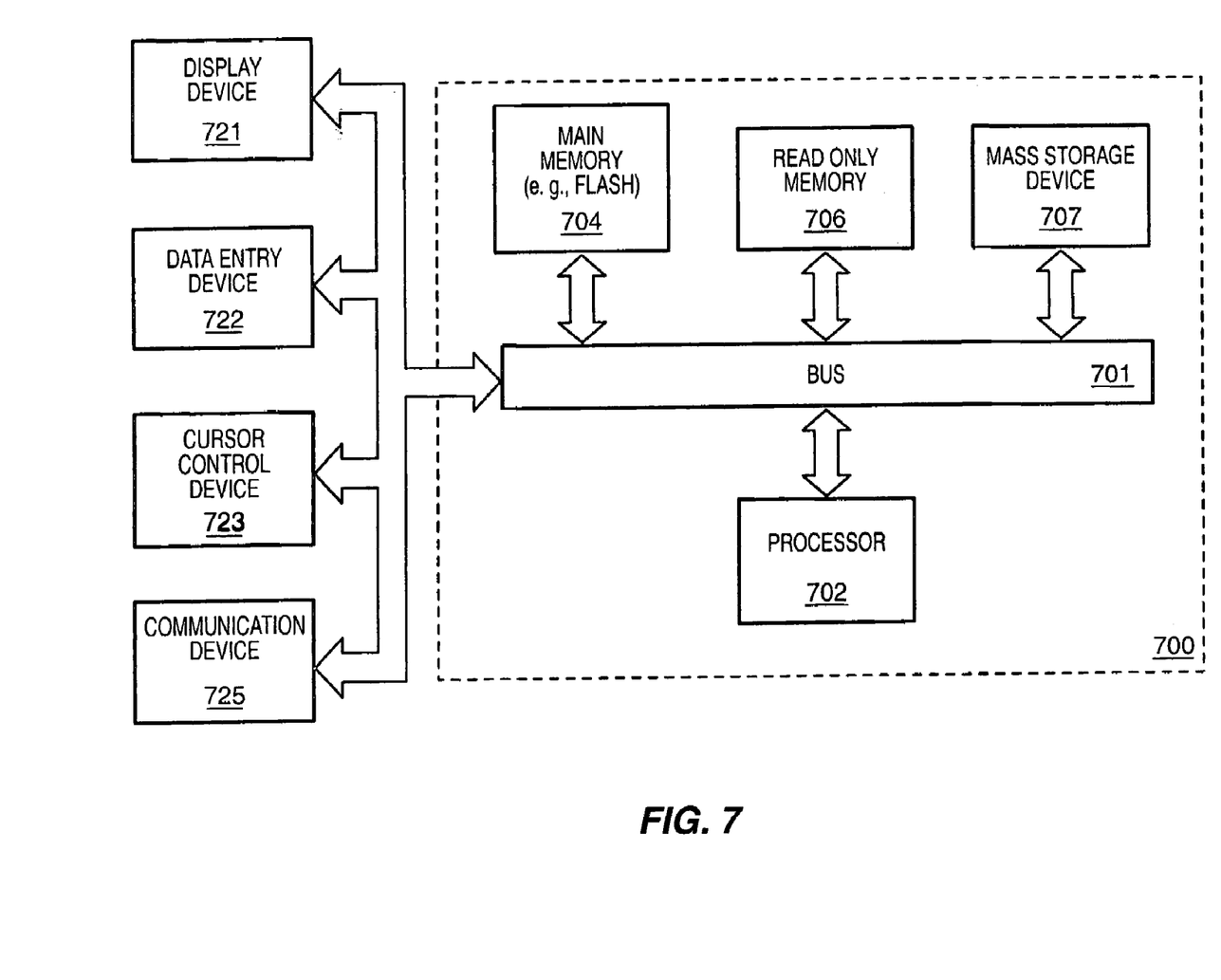
FIG. 7 shows a block diagram of a computer system in which embodiments of the invention may be implemented.

A computer system 700 representing an exemplary desktop, laptop, workstation, server, mainframe, etc., in which embodiments of the invention may be implemented will now be described with reference to FIG. 7. As discussed herein, a "computer system" may be an apparatus including hardware and/or software for processing data. The computer system 700 represents one possible computer system for implementing embodiments of the invention, however other computer systems and variations of the computer system 700 are also possible.

The computer system 700 comprises a bus 701 to communicate information, and a processor 702 coupled with the bus 701 to process information. In one aspect, the processor may execute model predictive control instructions involving inventory information and demand predictions to control inventories. The computer system 700 further comprises a random access memory (RAM) or other dynamic storage device 704 (referred to as main memory), coupled with the bus 701 to store information and instructions to be executed by the processor 702. The main memory 704 also may be used to store temporary variables or other intermediate information during execution of instructions by the processor 702. In one embodiment, the main memory 704 may be used to store the operating system, application programs, model predictive control instructions, demand prediction instructions, demand predictions, inventory information, and other types of instructions or information. Different types of memories that are employed in some, but not all, computer systems include DRAM memories, SRAM memories, and Flash memories. The computer system 700 also comprises a read only memory (ROM) and other static storage devices 706 coupled with the bus 701 to store static information and instructions for the processor 702, such as the BIOS. A data storage device 707 such as a magnetic disk, zip, or optical disc and its corresponding drive may also be coupled with the computer system 700 to store information and instructions.

The computer system 700 may also be coupled via the bus 701 to a display device 721, such as a cathode ray tube (CRT) or liquid crystal display (LCD), to display information to an end user. In one aspect, the display device may display control information to a practitioner. Typically, a data input device 722, such as a keyboard or other alphanumeric input device including alphanumeric and other keys, may be coupled with the bus 701 to communicate information and command selections to the processor 702. Another type of user input device is a cursor control device 723, such as a mouse, a trackball, or cursor direction keys, to communicate direction information and command selections to the processor 702 and to control cursor movement on the display 721.

A communication device 725 is also coupled with the bus 701. Depending upon the particular implementation, the communication device 725 may include a modem, a network interface card, or other well-known interface devices, such as those used for coupling to Ethernet, token ring, or other types of physical attachment for purposes of providing a communication link to support a local or wide area network, for example. In any event, in this manner, the computer system 700 may be coupled with a number of clients or servers via a conventional network infrastructure, such as a company's intranet, an extranet, or the Internet, for example. In one aspect, the communication device may link the computer system to other computer systems dispersed within a supply chain to allow assimilation and dissemination of control information, such as inventory information.

Other devices 525 may be coupled with the bus 510 in some but not all computer systems. Exemplary devices include, but are not limited to, a network interface, a communication interface, an audio device, and a video input device.

Embodiments of the invention are not limited to any particular computer system. Rather, embodiments may be used on any stand alone, distributed, networked, or other type of computer system. For example, embodiments may be used on one or more computers compatible with NT, Linux, Windows, Macintosh, any variation of Unix, or others.

VIII. General Matters

An embodiment of the invention may include various operations. The operations of the embodiment may be performed by hardware components, or may be embodied in machine-executable instructions, which may be used to cause a general-purpose or special-purpose processor or logic circuits programmed with the instructions to perform the operations. Alternatively, the operations may be performed by a combination of hardware and software.

An embodiment of the invention may be provided as a program product, which may include a computer-readable medium or other machine-readable medium having stored thereon an instruction or instructions, which may be used to program a machine, such as an instruction execution unit, a high-level controller, a microprocessor, an ASIC, an integrated circuit, a micro-electronic device, a computer system, other electronic devices, to perform a process. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, an embodiment of the invention may also be downloaded as a computer program product, wherein the program may be transferred from a remote computer to a requesting computer by way of data signals embodied in a carrier wave or other propagation medium via a communication link (e.g., a modem or network connection).

While the invention has been described in terms of several embodiments, those skilled in the art will recognize that the invention is not limited to the embodiments described, but may be practiced with modification and alteration within the spirit and scope of the appended claims. The description is thus to be regarded as illustrative instead of limiting.

What is claimed is:

1. A method comprising:
receiving a first demand prediction for a first type of electronic device, wherein the first type of electronic device has a first type of microelectronic package, wherein the first type of microelectronic package includes a die of a first type;
receiving a second demand prediction for a second type of electronic device, wherein the second type of electronic device has a second type of microelectronic package, wherein the second type of microelectronic package is different than the first type of microelectronic package, and wherein the second type of microelectronic package includes a die of the first type; and
using model predictive control to partition dice of the first type into a first assembly-die inventory and a second assembly-die inventory,
wherein the partitioning of the dice is based, at least in part, on the first and second demands predictions,
wherein the first assembly-die inventory corresponds to the first type of microelectronic package, and
wherein the second assembly-die inventory corresponds to the second type of microelectronic package that is different than the first type of microelectronic package.

2. The method of claim 1, wherein the first demand prediction is for a future time that is related to a throughput time of a supply chain used in manufacture of the first type of electronic device.

3. The method of claim 2, wherein the future time is proportional to the throughput time.

4. The method of claim 1, wherein the first type of microelectronic package comprises a ceramic substrate, and wherein the second type of microelectronic package does not comprise a ceramic substrate.

5. The method of claim 1, wherein the first type of electronic device comprises a server, and wherein the second type of electronic device comprises a desktop computer system.

6. The method of claim 1, wherein the dice comprise microprocessors.

7. The method of claim 1, wherein the partitioning is also based, at least in part, on current levels of the first and second assembly-die inventories.

8. A machine-readable medium having stored thereon data representing sequences of instructions that, if executed, cause a machine to perform operations comprising:
receiving a first demand prediction for a first type of electronic device, wherein the first type of electronic device has a first type of microelectronic package, wherein the first type of microelectronic package includes a die of a first type;
receiving a second demand prediction for a second type of electronic device, wherein the second type of electronic device has a second type of microelectronic package, wherein the second type of microelectronic package is different than the first type of microelectronic package, and wherein the second type of microelectronic package includes a die of the first type; and
using model predictive control to partition dice of the first type into a first assembly-die inventory and a second assembly-die inventory,
wherein the partitioning of the dice is based, at least in part, on the first and second demands predictions,
wherein the first assembly-die inventory corresponds to the first type of microelectronic package, and wherein the second assembly-die inventory corresponds to the second type of microelectronic package that is different than the first type of microelectronic package.

9. The machine-readable medium of claim 8, wherein the first demand prediction is for a future time that is related to a throughput time of a supply chain used in manufacture of the first type of electronic device.

10. The machine-readable medium of claim 8, wherein the first type of microelectronic package comprises a ceramic substrate, and wherein the second type of microelectronic package does not comprise a ceramic substrate.

11. The machine-readable medium of claim 8, wherein the first type of electronic device comprises a server, and wherein the second type of electronic device comprises a desktop computer system.

12. A method comprising:
receiving a demand prediction for microprocessors;
using model predictive control to control an inventory of the microprocessors based, at least in part, on the demand prediction; and
using model predictive control to control an inventory of chipset components that are to be used along with the microprocessors in manufacture of computer systems,
wherein the control of the inventory of the chipset components is based, at least in part, on the demand prediction for the microprocessors.

13. The method of claim 12, wherein the demand prediction is for a future time that is related to a throughput time of a supply chain used in manufacture of the microprocessors.

14. The method of claim 13, wherein the future time is proportional to the throughput time.

15. The method of claim 12, wherein the chipset components comprise input/output controller chips.

16. The method of claim 12, wherein said controlling the inventory of the chipset components comprises controlling addition of the chipset components to the inventory and removal of the chipset components from the inventory.

17. A machine-readable medium having stored thereon data representing sequences of instructions that, if executed, cause a machine to perform operations comprising:
receiving a demand prediction for microprocessors;
using model predictive control to control an inventory of the microprocessors based, at least in part, on the demand prediction; and
using model predictive control to control an inventory of chipset components that are to be used along with the microprocessors in manufacture of computer systems,
wherein the control of the inventory of the chipset components is based, at least in part, on the demand prediction for the microprocessors.

18. The machine-readable medium of claim 17, wherein the demand prediction is for a future time that is related to a throughput time of a supply chain used in manufacture of the microprocessors.

19. The machine-readable medium of claim 17, wherein the chipset components comprise input/output controller chips.

20. The machine-readable medium of claim 17, wherein said controlling the inventory of the chipset components comprises controlling addition of the chipset components to the inventory and removal of the chipset components from the inventory.

* * * * *